Figure 1:
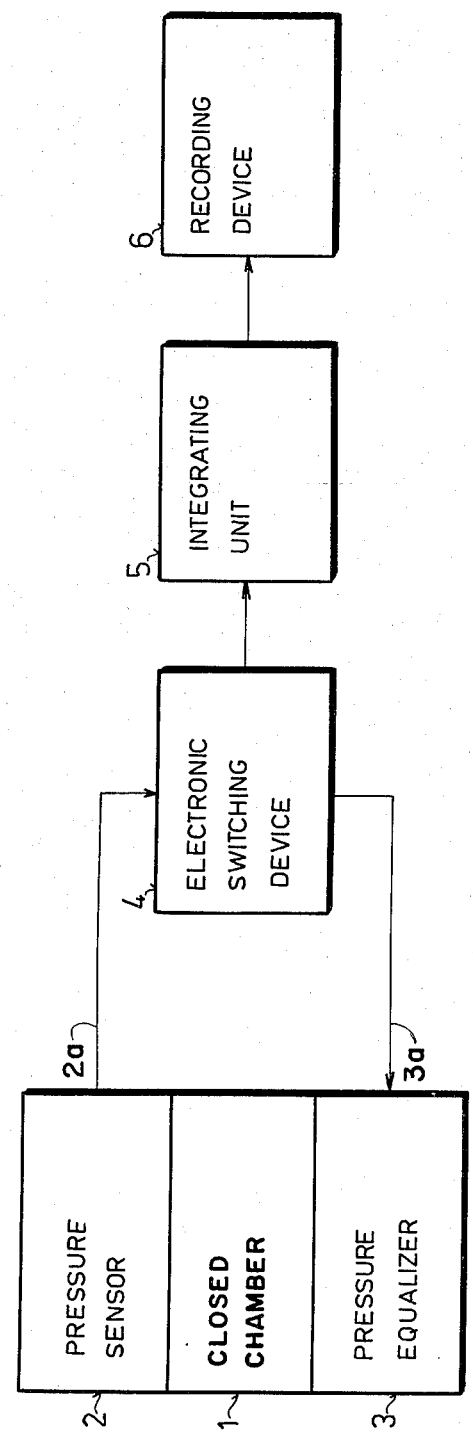

United States Patent [19]

Kotulák et al.

[11] 3,926,563

[45] Dec. 16, 1975

[54] APPARATUS FOR MEASUREMENT OF VOLUMETRIC CHANGES DURING CHEMICAL REACTIONS, NAMELY OXIDATION REACTIONS

[75] Inventors: Ludovít Kotulák, Prague; Jiří Svantner, Unhost, both of Czechoslovakia

[73] Assignee: Ceskoslovenska akademie ved, Prague, Czechoslovakia

[22] Filed: June 10, 1974

[21] Appl. No.: 477,843

[30] Foreign Application Priority Data

June 12, 1973 Czechoslovakia ............... 4248-73

[52] U.S. Cl. ............ 23/255 E; 204/129; 204/195 R
[51] Int. Cl.² .................. G01N 7/18; G01N 27/44; G01N 31/06
[58] Field of Search ....... 23/255 E; 204/129, 195 R; 261/87

[56] References Cited

UNITED STATES PATENTS

| | | |
|---|---|---|
| 2,187,746 | 1/1940 | Lefevre ............................ 261/87 |
| 2,410,429 | 11/1946 | Daman ............................ 261/87 |
| 3,045,665 | 7/1962 | Moyat ............................ 204/129 X |
| 3,134,649 | 5/1964 | Staunton et al. ............... 23/253 R |
| 3,282,803 | 11/1966 | Poepel et al. ............... 204/195 R X |

OTHER PUBLICATIONS

Mahoney et al., Anal. Chem. 36, 2516 (1964).

*Primary Examiner*—Robert M. Reese

[57] ABSTRACT

Apparatus for measurement of volumetric changes in chemical reactions, especially in oxidation reactions, which is connected to a closed chamber where the volumetric changes have to be measured and consists of a pressure equalizer and a pressure sensor connected to the given closed chamber, wherein the output of the pressure sensor is connected to an electronic switching device controlling the pressure equalizer and an integrating unit for generation of an integral time function of the gas consumption, the output of which is a source of information about the course of gas volume changes in the given closed chamber.

7 Claims, 3 Drawing Figures

APPARATUS FOR MEASUREMENT OF VOLUMETRIC CHANGES DURING CHEMICAL REACTIONS, NAMELY OXIDATION REACTIONS

The invention relates to an apparatus for measurement of volumetric changes during chemical reactions, namely oxidation reactions.

Volumetric apparatuses operating at the constant pressure of gas or manometric apparatuses working at the constant gas volume and recording the pressure changes are most frequently used for measurement of the gas absorption. The measurement technique of the gas absorption by both the volumetric and the manometric method requires reading of data within regular intervals of time. The apparatuses described up to the present time employ for recording of the gas absorption the change of the resistance of a platinum wire placed in a burette with mercury, which is a function of the mercury column length in the burette (Ryšavý D., Balabán L., Slavík V., Růža J.: Vysokomol. Soedin. 1961, 3, 470, 1110; Dotterer G. O.: Rev. Sci. Instr. 1971, 42, 471; Cepalov V. F.: Zav. Lab. 1964, 1 111). The constant pressure is usually maintained by electrolysis of oxalic acid (Cepalov V. F.: Zavod. Lab. 1964, 1, 111), copper (II) sulfate (De Merher J., Le Bras J.: Ind. Eng. Chem., Prod. Res. Develop. 1963, 2, 22), by a piston motion (Mahoney L. R., Bayma R. W., Warnick A., Ruof C. H.: Anal. Chem. 1964, 36, 2516) or by a movement of a mercury drop (Ryšavý D., Balabán L., Slavík V., Růža J.: Vysokomol. Soedin. 1961, 3, 470). The motion of the piston is recorded by a recorder by means of a linear potentiometer. The disadvantage of the present apparatuses is a small possibility to choose the range and sensitivity of the record of gas absorption rate and, mainly, that the record is limited by the width of the paper chart (length of the resistance wire) (Ryšavý D., Balabán L., Slavík V., Růža J.: Vysokomol. Soedin. 1961, 3, 470, 1110; Dotterer G. O.: Rev. Sci. Instr. 1971, 42, 471; Cepalov V. F.: Zav. Lab. 1964, 1, 111), by the range of the potentiometer and volume of the piston (Mahoney L. R., Bayma R. W., Warnick A., Ruof C. H.: Anal. Chem. 1964, 36, 2516).

An objective of the invention is the apparatus for meaasurement of volumetric changes during chemical reactions, especially oxidation reactions, which is connected with a closed chamber where the volumetric changes occur and which consists of a pressure equalizer and a pressure sensor, both connected to the aforementioned closed chamber, wherein the pressure sensor output is connected to an electronic switching mechanism operating the pressure equalizer and to an integrating mechanism which produces an integral time function of the gas consumption and an output of which represents a source of data about the course of gas volume changes in the given closed chamber.

The pressure sensor may be advantageously a contact manometer provided with an arm $2b$ for a manual setting of the contact liquid level. The electronic switching mechanism may be formed advantageously by a switch amplifier with a power output operating at the same time the pressure equalizer and the integrating mechanism formed advantageously by a synchronous servomotor with electrically controlled revolutions and a gear box connected with a stopless circular potentiometer and generating the integral function of the gas consumption. The circular potentiometer is energized by a temperature and time stabilized voltage.

A recording device, advantageously a line recorder, is connected to the output of the integrating potentiometer, while the number of revolutions of the integrating potentiometer determines the number of following records of the recorder. The closed chamber where the volumetric changes have to be measured is advantageously equipped with a stirrer for liquids, especially in the case of measurements of the oxidation reaction in liquids. The upper part of the stirrer carries a ferromagnetic body and has an opening for gas sucking, while the lower part has skew ground hollow arms which such the gas below the liquid level by their rotation.

The described apparatus operates at the constant pressure and records the time course of the gas volume, for instance, the volume of oxygen released by the pressure equalizer (e.g. an electrolyzer), which corresponds to the volume of the gas absorbed in the reaction at the low conversion when the formation of volatile reaction products may be neglected. The described arrangement may be used, for example, in oxidation of liquid compounds or their solutions of a volume 1.5 to 15 ml. The oxygen volume from 1 $\mu$l and the absorption rate of oxygen up to 0.38 ml/min are recorded. The absorption recording is not limited by the width of the recorder chart paper.

The invention is further illustrated on an example using drawings, where

Figure 2:
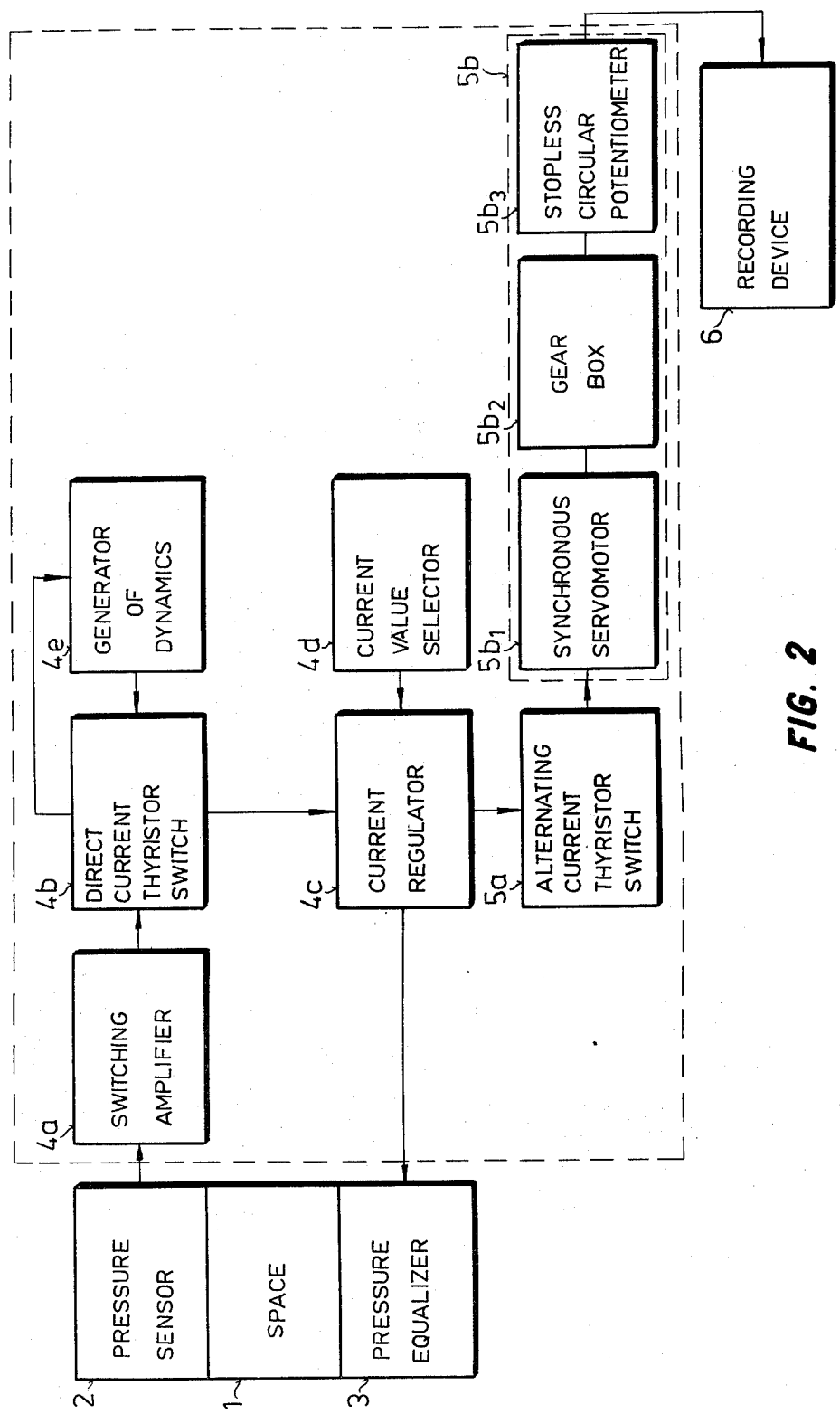
Figure 3:
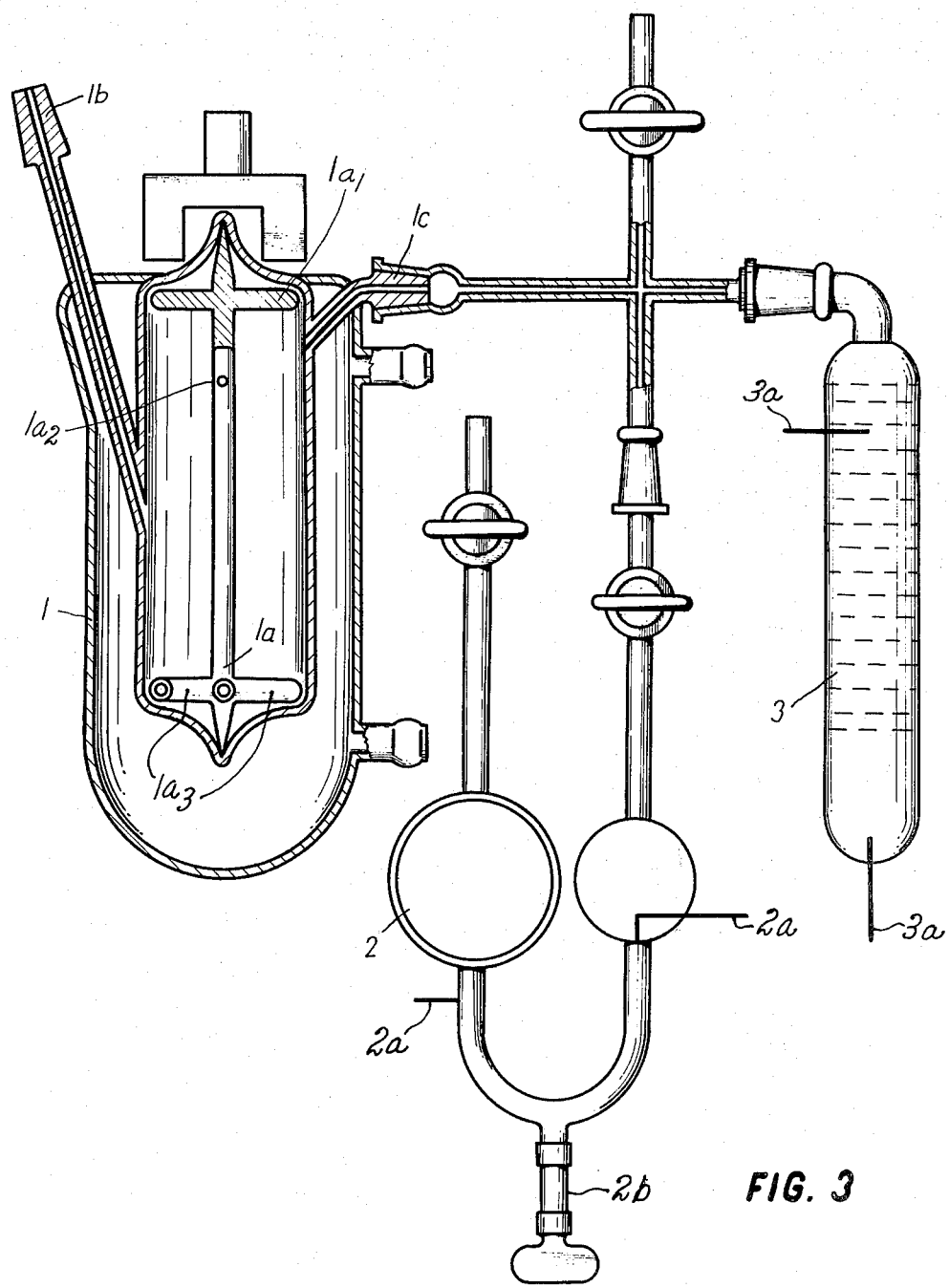

FIG. 1 shows a simplified block diagram of the apparatus,

FIG. 2 contains a block diagram with the delailed arrangement of the electronic part and FIG. 3 shows the scheme of a glass part of the apparatus.

The reactor 1 is equipped with a stirrer $1a$ mounted in molded seats along the axis of the vessel. An ferromagnetic body $1a$, is sealed inside an upper part of the stirrer and a permanent magnet is used for rotation. The arms $1a_3$ of the lower part of the stirrer are hollow and skew ground in such a way, that gas is sucked through the opening $1a$ in the stirrer axis above the liquid level and dispersed into the stirred compound. This arrangement enables a perfect agitation and saturation of the system with gas, e.g. oxygen or hydrogen. Two capillary tube outlets with ground joints are situated in the upper part of the reactor 1. The tube $1b$ serves for charging the reaction vessel or for withdrawing of samples. The reactor is connected to the electrolyzer and to the registration part of the apparatus by the tube $1c$.

The pressure sensor 2, for instance, a contact manometer, is filled with mercury overcast e.g. with dibutyl phthalate or tributyl phosphate. The automatic replenishment of gas, for example, of oxygen consumed in a reaction, and thus maintaining a constant pressure in the apparatus is provided by the pressure equalizer 3, for example, an electrolyzer filled with a saturated solution of copper (II) sulfate or sodium hydroxide. If the pressure in the apparatus drops, the manometer contacts forming an input signal for the electronic part of the apparatus are closed. The electrolyzer produces gas in the amount corresponding to the volume consumed in the reaction.

The electronic part of the apparatus performs two fundamental functions:

1. it controls the pressure in the reaction space to a constant value,
2. it produces an integral time function of the gas amount, e.g. of oxygen or hydrogen supplied by the pressure equalizer, e.g. by the electrolyzer.

From the standpoint of the first mentioned function, the electronic part of the apparatus operates as a discontinuous double-position pressure controller. It consists of a switching amplifier $4a$, a direct current thyristor switch $4b$, and a current regulator $4c$ with a selector of the current value $4d$. A discontinuous double-value signal from the pressure sensor 2, e.g. the contact manometer, is led to the input of the switching amplifier $4a$. To provide the best sensitivity and long life of the contact manometer, its current and voltage load must be limited to a minimum. With respect to this, the input circuits of the switching amplifier are designed in such a way, that the current of the switched-on contact manometer is less than $5 \times 10^{-6}$ A and the voltage of the switched-off contact manometer is below 1 V. The switching amplifier $4a$ has two reciprocal inversion outputs actuating the direct-current thyristor switch $4b$. They are connected to the closing and breaking inlets of the direct-current thyristor switch $4b$. Depending on the signal of the contact manometer, this switch connects a supply voltage to an input of the current regulator which regulator which operates as an impulse controlled constant current supply. The current regulator $4c$ keeps the adjusted constant current amplitude to feed the electrolyzer independently from changes of the electrolyte conductivity during electrolysis. The current value selector $4d$ enables to set the current amplitude 10, 25, 50, 75 or 100 mA. The current stability as high as 0.2% is achieved by introducing the temperature compensations and by a stringent selection of parts. The ambient temperature may then range between 20° – 30° C and the electrolyzer resistance may change from 50 to 150 ohms.

In the dynamic steady state, when the continuous absorption of gas (e.g. oxygen) proceeds in the reactor, the electrolyzer is supplied by current impulses with a constant amplitude and the impulse frequency ranges from 0.2 imp/s to 2 imp/s. The higher the current impulse frequency, the more accurately is maintained the constant pressure value in the reactor. Introduction of so called "dynamic lubrication" has a favourable effect here, similarly as in many other applications of the control technique. The simplest way of realization is placing the glass part of the apparatus on the common frame with the stirrer. Vibrations of the motor are transferred by the construction to the glass apparatus itself and cause a weak oscillation here. In the presence of this dynamic lubrication, the recorded oxidation curves have the almost continuous character. However, the oscillations and vibrations are not always entirely regular and do not possess a character of the purely harmonic waves. Therefore, they may cause also negative effects in the controlling process, especially if the glass part of the apparatus is exposed to a transfer or impacts and shakings from the neighbourhood. Under such conditions, transition effects arise in the contact manometer which are difficult to treat and which may cause false irreversible switching of the direct-current thyristor switch $4b$. This is the situation when both thyristors are simultaneously in the conductive state and the switch cannot be switched-off in the usual way. Therefore, the electronic part of the apparatus is equipped with a generator of dynamics $4e$ with a controlling logic circuit which permanently evaluates the state of the direct-current thyristor switch $4b$. If the irreversible switching takes place, the controlling logic circuit deblocks the action of the generator of dynamics $4e$ and the impulse from this generator restores a normal function of the direct current thyristor switch $4b$. To fulfil the second fundamental function above mentioned, i.e., to produce an integral time function of the gas amount, e.g. of oxygen supplied by the pressure equalizer 3 (e.g. the electrolyzer), the electronic part of the apparatus is provided with an integration unit $5b$ and an alternating current thyristor switch $5a$. This switch is controlled by a signal derived from the current regulator $4c$ and supplies a synchronous servomotor $5b_1$ of the integration unit $5b$. Application of high-speed thyristor switches provides a perfect parallelity between the intervals of feeding the pressure equalizer 3 (e.g. electrolyzer) with direct current and the individual single steps of the integrating unit $5b$. The theoretical analysis showed and practical measurements proved that deviations from the ideal parallelity are substantially lower than 0.1%.

The integrating unit $5b$ is an electromechanical type and consists of the synchronous servomotor $5b_1$ with an eight-speed shifting gear box $5b_2$ (the revolution range from 1 rev. per 3 min to 1 rev. per 3 hr) and a precise stopless potentiometer $5b_3$ with a closed circular path. Between feeding points of the potentiometer $5b_3$, an insulating gap of 9° occurs, i.e., 2.5 % of the entire circular path. This has to be respected in evaluation of the measuring records, because during motion of the potentiometer $5b_3$ slider along the insulating gap, an output voltage is zero so that the absorption course of oxygen is not recorder by the recorder 6 in this section. The record is arranged in the way, that the extrapolation of missing parts of the record can be simply done after completion of the experiment. This is realized by decreasing the maximum voltage just on 2.5% of the rated range of the recorder 6. The reference voltage for the potentiometer $5b_3$ is stabilized by a temperature compensated semiconductor diode which quarantees stability of the output voltage for recording better than 0.01 % for the ambient temperature +20° to +°C. The output voltage of the integrating unit $5b$ is recorded by the line or point recorder 6 while the number of revolutions of the potentiometer $5b_3$ determines the number of one to another linked records of the recorder 6. The recording sensitivity may be selected by the rotation speed of the potentiometer $5b_3$ of the integrating unit $5b$ and by switching over the range of stabilized current for the electrolyzer (10 to 100 mA). For example, the recorder range corresponds to 0.1161 ml of oxygen at the rotation speed 1 rev/ 3 min and the current 10 mA and to 69.64 ml of oxygen at the potentiometer speed 1 rev/3 hr and the current 100 mA.

A time base of the absorption record is given by the chart paper translation speed in the recorder 6. The speed can be chosen during operation in such a way that the key parts of the absorption curve, e.g. of the given integral function of gas consumption, are preferentially followed in detail.

Examplary operation course for oxidation

An oxidated compound or its solution with other compounds, e.g. initiator, sensitizer or inhibitor is introduced into the thermostated reator 1, i.e., into the space where volumetric changes will be measured, which is furnished with the capillary filling tube $1b$, by means of a syringe. The whole apparatus is flushed with oxygen while the manometer 2 is closed. After closing of the capillary filling tube $1b$, the stirrer, recorder and controller (with recording off) are switched on at the same time. The absorption recording is switched on after the pressure in the apparatus is stabilized (about 3 min).

The position of the absorption zero on the chart paper may be chosen by the switch of electrolyzer 1 before starting the experiment. The range of the stabilized current for electrolyzer and translation speed of the potentiometer can be also varied during the experiment. This enables to set various recording sensitivities in the individual phases of oxidation. This capacity is expecially advantageous at inhibited oxidations of liquid compounds when the relatively small amounts of oxygen are absorbed during the induction period and a multiple increase of the oxygen absorption rate takes place after this period.

The apparatus was tested by comparison of results from six independent experiments with data published by Mahoney (Anal. Chem. 1964, 36, 2516). A solution of Tetraline in chlorobenzene was oxidized at 60°C in the presence of azobisisobutyronitrile (AIBN): 0.670 mole of Tetraline per liter of chlorobenzene, $c_{AIBN} = 2.93 \times 10^{-3}$ mol/l. The average value of the oxidation rate was 0.01603 ml $O_2$/min; Mahoney published 0.01555 ml $O_2$/min as the average value from four measurements.

The apparatus according to the invention is suitable for following the consumption rate of gas (e.g. oxygen, hydrogen, chlorine, carbon dioxide, etc.) within broad region at both the short and long lasting processes. It is suitable for measurements and recording of gas consumption in dependence upon time in chemical, biochemical and physiological reactions and in microbiological processes. The apparatus may be also applied for integrating measurements and recording of all processes where the measured quantity varies with two variables while zero value of the measured quantity corresponds to the state 0, and an arbitrary value constant with time corresponds to the state 1, e.g. a constant through-flow of liquid, gas, electric current, and the like, through a valve which is entirely irregularly opened and closed by an arbitrary device, while the determination of the total mass-flow is required during the given process.

We claim:
1. An apparatus for measurement of volumetric changes at constant pressure, which comprises
   a. a closed reaction chamber where a chemical reaction occurs;
   b. a pressure equalizer joined to said chamber through a tube;
   c. a pressure sensor joined to said chamber through tube;
   d. an electronic switching device joined to an input of said pressure equalizer and to an output of said pressure sensor; and
   e. said electronic switching device electrically communicating with an input of an integrating unit which measures an integral function of gas consumption in dependence on time.
2. An apparatus according to claim 1, wherein the pressure sensor is a contact manometer provided with an arm for the manual adjusting of the contact liquid level.
3. An apparatus according to claim 1, wherein the electronic switching device is a switching amplifier with a power output controlling the pressure equalizer and the integrating unit at the same time.
4. An apparatus according to claim 1, wherein the pressure equalizer is an electrolyzer.
5. An apparatus according to claim 1, wherein the integrating unit consists of a synchronous servomotor with a gear box connected with a stopless circular integrating potentiometer and generates integral time functions of the gas consumption.
6. An apparatus according to claim 1, wherin a recording device is connected to an output of an integrating potentiometer.
7. An apparatus according to claim 1, wherein the closed chamber where the volumetric changes have to be measured is equipped with a stirrer of liquids, the upper part of which contains a ferromagnetic body and an opening for gas suction and the lower part of which has skew ground hollow arms sucking gas below the liquid level by their rotation.

* * * * *